(12) United States Patent
Ochiai et al.

(10) Patent No.: US 10,868,493 B2
(45) Date of Patent: Dec. 15, 2020

(54) TRANSMISSION DEVICE FOR CURRENT SIGNAL OF SOLAR STRING

(71) Applicant: THE UNIVERSITY OF TOKYO, Tokyo (JP)

(72) Inventors: Hideya Ochiai, Tokyo (JP); Hiroyuki Ikegami, Tokyo (JP)

(73) Assignee: THE UNIVERSITY OF TOKYO, Tokyo (JP)

(*) Notice: Subject to any disclaimer, the term of this patent is extended or adjusted under 35 U.S.C. 154(b) by 37 days.

(21) Appl. No.: 16/313,949

(22) PCT Filed: Jun. 28, 2017

(86) PCT No.: PCT/JP2017/023661
§ 371 (c)(1),
(2) Date: Dec. 28, 2018

(87) PCT Pub. No.: WO2018/003825
PCT Pub. Date: Jan. 4, 2018

(65) Prior Publication Data
US 2019/0199282 A1 Jun. 27, 2019

(30) Foreign Application Priority Data
Jun. 30, 2016 (JP) .................. 2016-130122

(51) Int. Cl.
*H02S 50/00* (2014.01)
*H02J 13/00* (2006.01)
*H04B 3/54* (2006.01)

(52) U.S. Cl.
CPC .............. *H02S 50/00* (2013.01); *H02J 13/00* (2013.01); *H02J 13/0003* (2013.01);
(Continued)

(58) Field of Classification Search
CPC ....... H02J 13/00; H02J 13/0003; H02S 50/00; H04B 3/546; H04B 3/548; Y02E 60/7892; Y02E 10/50; Y04S 40/146; Y04S 40/121
See application file for complete search history.

(56) References Cited

U.S. PATENT DOCUMENTS 6,093,885 A * 7/2000 Takehara ................ H02S 40/12
136/244
8,823,218 B2 * 9/2014 Hadar ..................... H02J 3/385
307/151
(Continued)

FOREIGN PATENT DOCUMENTS

CN 102422506 A 4/2012
CN 104685785 A 6/2015
(Continued)

OTHER PUBLICATIONS

Office Action dated Sep. 10, 2019 issued in corresponding Japanese Patent Application No. 2016-130122 (6 pages).
(Continued)

*Primary Examiner* — Vinh P Nguyen
(74) *Attorney, Agent, or Firm* — Polsinelli PC

(57) ABSTRACT

The present disclosure provides a technique capable of improving an SN ratio of a current signal which is superimposed on a power line in a photovoltaic string and transmitted and efficiently specifying a failure location. A current source 151 is connected to a power line 11 in parallel with each of photovoltaic elements 14. A controller 152 controls a current value of the current source 151 such that a current signal is generated. A bypass capacitor 153 is connected to the power line 11 to be parallel to the each of the photovoltaic elements 14 and the current source 151. Accordingly, the bypass capacitor 153 can transmit a current
(Continued)

signal transmitted through the bypass capacitor 153 from a negative electrode side in a photovoltaic string to a positive electrode side.

19 Claims, 10 Drawing Sheets

(52) U.S. Cl.
CPC ............ *H04B 3/546* (2013.01); *H04B 3/548* (2013.01); *Y02E 60/00* (2013.01); *Y04S 40/121* (2013.01)

(56) References Cited

U.S. PATENT DOCUMENTS

| | | | | |
|---|---|---|---|---|
| 9,960,732 | B2 * | 5/2018 | Hoft | H02H 3/08 |
| 2012/0098344 | A1 | 4/2012 | Bergveld et al. | |
| 2013/0089120 | A1 | 4/2013 | Kasai et al. | |
| 2014/0307811 | A1 * | 10/2014 | Han | H04B 3/56 |
| | | | | 375/257 |
| 2015/0094967 | A1 * | 4/2015 | Kouno | H02S 50/00 |
| | | | | 702/58 |
| 2015/0222227 | A1 * | 8/2015 | Nishizawa | H02J 3/381 |
| | | | | 324/761.01 |
| 2016/0156308 | A1 * | 6/2016 | Alon | H02J 3/385 |
| | | | | 136/244 |
| 2018/0102733 | A1 * | 4/2018 | Kakalia | H02S 50/00 |
| 2019/0181800 | A1 * | 6/2019 | Nesemann | H02S 40/36 |

FOREIGN PATENT DOCUMENTS

| | | |
|---|---|---|
| JP | 2014 155 271 A | 8/2014 |
| WO | 2011/158681 A1 | 12/2011 |
| WO | WO-2014/122914 A1 | 8/2014 |

OTHER PUBLICATIONS

F. Di Napoli, "A Power Line Communication on DC bus with photovoltaic strings", IEEE Renewable Power Generation Conference, Sep. 24-25, 2014.

H. Ochiai, "PPLC-PV: A Pulse Power Line Communication for Series-Connected PV Monitoring", 2016 IEEE International Conference on Smart Grid Communication (Smart Grid Comm): Communications, Networks and Architectures to Enable the Smart Grid, Nov. 6-9, 2016.

Office Action dated Nov. 25, 2019 issued in corresponding Chinese Patent Application No. 201780040175.7 (8 pages).

Chinese Office Action dated Jun. 23, 2020 issued in corresponding Patent Application No. 201780040175.7 (10 pages).

* cited by examiner

F I G. 4
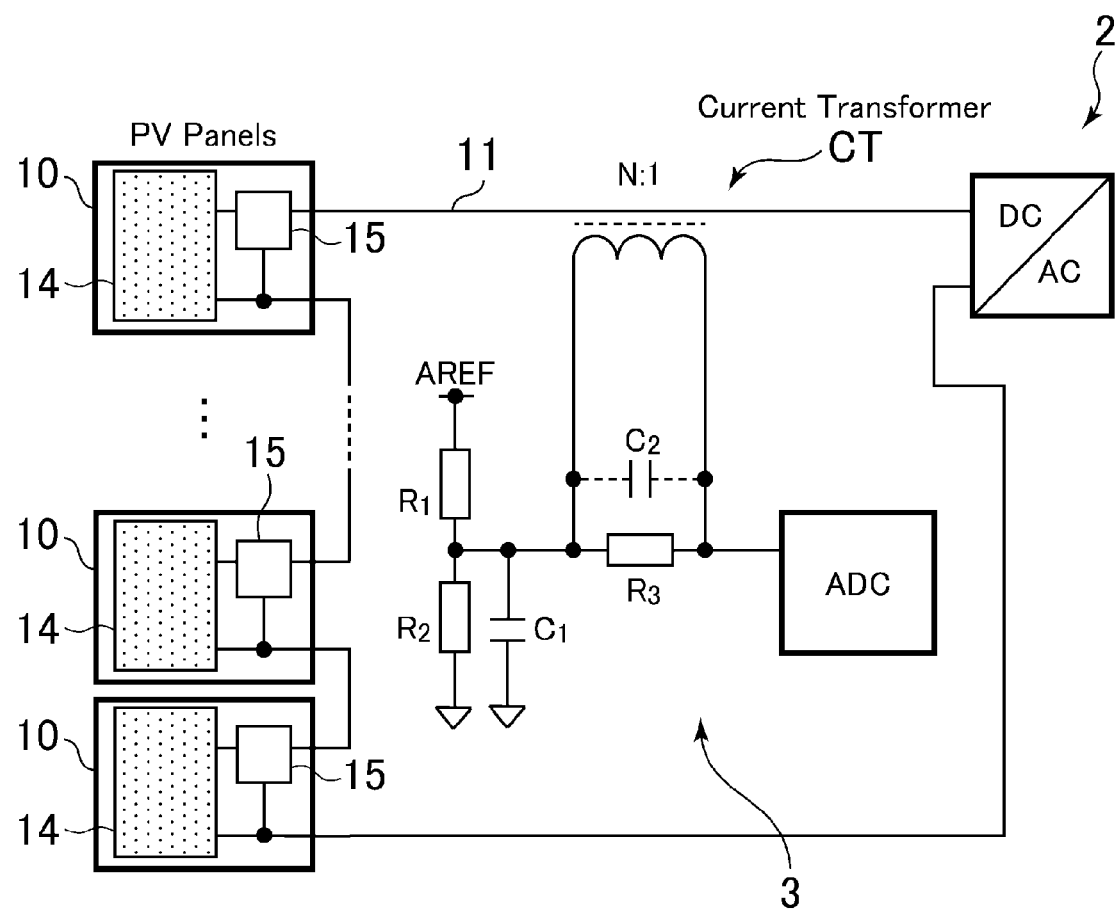

F I G. 8
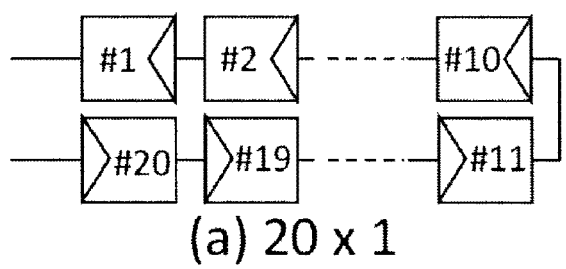
(a) 20 x 1
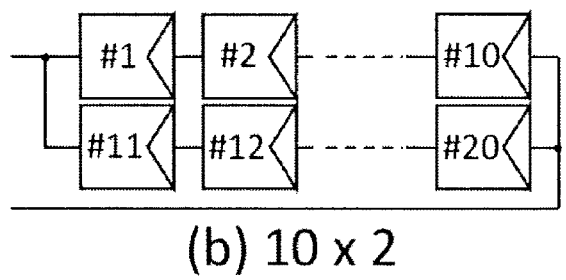
(b) 10 x 2
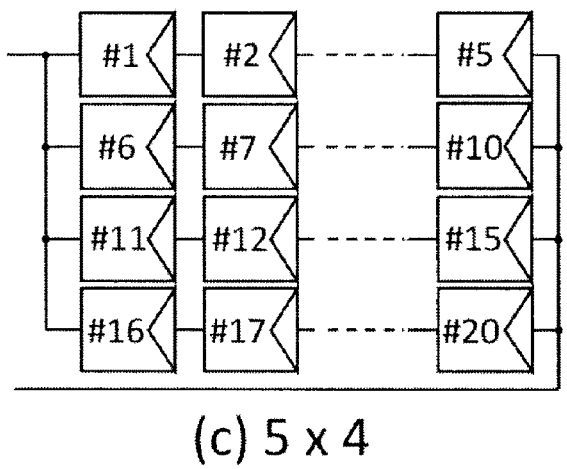
(c) 5 x 4

TRANSMISSION DEVICE FOR CURRENT SIGNAL OF SOLAR STRING

CROSS REFERENCE TO RELATED APPLICATIONS

This application is a National Phase filing under 35 U.S.C. § 371 of PCT/JP2017/023661 filed on Jun. 28, 2017; and this application claims priority to Application No. 2016-130122 filed in Japan on June 30, under 35 U.S.C. § 119. The entire contents of each application are hereby incorporated by reference.

TECHNICAL FIELD

The present disclosure relates to a technique of transmitting a current signal in a photovoltaic string.

BACKGROUND ART

A photovoltaic string is a series circuit which is configured such that a plurality of photovoltaic modules each including a photovoltaic element are connected in series via a power line and extracts electric power. A configuration in which photovoltaic strings are arranged in parallel is also referred to as a photovoltaic array. It is possible to extract electric power generated from sun light efficiently by using photovoltaic strings (including the photovoltaic array).

In a case in which any one of photovoltaic modules constituting a photovoltaic string has a failure, electric power to be extracted is decreased, and power generation efficiency deteriorates. In the case of a failure visible from the outside (such as an external damage), it is possible to perform abnormality detection by a worker or monitoring with a camera. However, when a failure occurs in a photovoltaic module, it is difficult to specify an abnormal panel visually. In this case, even though there is an abnormality in the entire power generation amount of the photovoltaic string, since the costs for specifying an abnormal panel or performing an exchange work occur, economic efficiency of a photovoltaic power plant is adversely affected. In particular, a photovoltaic element used in a typical photovoltaic module operates as a current source (that is, resistance infinity). In a case in which some photovoltaic module in a string have a failure, and a current value flowing from a photovoltaic element decreases (for example, from 1 A to 0.1 A), the power generation efficiency deteriorates remarkably since the current value flowing through the entire string decreases (for example, becomes 0.1 A) due to continuity of current.

A technique in which a current signal is superimposed on an electric current of a power line in a photovoltaic string and transmitted, and a current signal is received by a receiver is described in FIGS. 1 to 3 of Patent Document 1.

In this technique, since the current signal is transmitted via a parasitic capacitor in the photovoltaic module, a signal strength is weak, and an SN ratio of a signal tends to be likely to deteriorate. For this reason, in a case in which the number of panels connected in series (so-called the number of stages) increases, there is a problem that it is hard to use this technique.

A configuration in which individual photovoltaic modules are connected in parallel, and monitoring information is individually transmitted on the power line is considered. However, in this configuration, a large electric current flows at a low voltage, and electric power transmission efficiency via the power line is lowered, and thus it is not common, and it is common that an apparatus (inverter) on a side in which electric power is received does not support such a configuration. Of course, there is a technique of arranging wirings for transmitting the monitoring information (or wireless equipment in the case of wireless transmission) in each photovoltaic module separately from the power line, but there is a problem in that an apparatus configuration becomes complicated.

CITATION LIST

Patent Document

Patent Document 1: JP-A-2014-155271 (FIGS. 1 to 3)

SUMMARY OF THE INVENTION

Technical Problem

The present disclosure was made in light of the foregoing. It is a main object of the present disclosure to provide a technique capable of improving an SN ratio of a current signal which is superimposed on a power line in a photovoltaic string and transmitted and efficiently specifying a failure location.

Solution to Problem

A means for solving the above-mentioned problems can be described as in the following items.

(Item 1)

A transmitting apparatus for transmitting monitoring information as a current signal in a photovoltaic string including a plurality of photovoltaic elements connected to each other in series via a power line, the transmitting apparatus including:

a current source;
a controller; and
a bypass capacitor, in which the current source is connected to the power line in parallel with each of the photovoltaic elements, the controller is configured to control a current value of the current source such that the current signal is generated, and the bypass capacitor is connected to the power line to be parallel to the each of the photovoltaic elements and the current source so that a current signal transmitted through the bypass capacitor from a negative electrode side in the photovoltaic string can be transmitted to a positive electrode side.

(Item 2)

A current polarity of the current source connected to the power line is the same as the photovoltaic cell element to which the current source is connected in parallel.

(Item 3)

The transmitting apparatus according to item 1 or 2, further including a transmitting diode which is connected between the current source and the bypass capacitor so as to block the electric current from being transmitted from the current source to the bypass capacitor and to feed the electric current to the power line.

(Item 4)

The transmitting apparatus according to item 3, further including a resistor which is connected in series to the bypass capacitor and in parallel to the transmitting diode.

(Item 5)

The transmitting apparatus according to any one of items 1 to 4, in which the current source includes a pump capacitor that accumulates electric charges when the current signal is turned off in response to a signal from the controller and transmits the electric current to the power line when the current signal is turned on.

(Item 6)

The transmitting apparatus according to any one of items 1 to 4, in which the current source includes a discharging coil configured to accumulates magnetic flux by drawing the electric current in response to an ON signal from the controller, and to turn off the current signal after the electric current is transmitted to the power line for a period of time according to a time constant of the discharging coil in response to an OFF signal from the controller.

(Item 7)

A monitoring apparatus, including:
the transmitting apparatus according to any one of items 1 to 6; and
a receiver configured to receive the current signal transmitted via the power line.

(Item 8)

A photovoltaic power generation system, including:
the monitoring apparatus according to item 7; and
a power extractor that extracts electric power transmitted via the power line.

Advantageous Effects of the Invention

According to the present disclosure, it is possible to improve an SN ratio of a current signal which is superimposed on a power line in a photovoltaic string and transmitted and efficiently specify a failure location.

BRIEF DESCRIPTION OF THE DRAWINGS

FIG. 4 is a circuit diagram illustrating a configuration example of a receiver used in the system of FIG. 1.

FIG. 5(a) illustrates a detection waveform in a receiver, FIG. 5(b) illustrates a waveform after a smoothing process, and FIG. 5(c) illustrates a digital signal obtained by a comparison with a threshold value.

FIG. 8 is an explanatory diagram for describing an example of an array state of a photovoltaic module, FIG. 8(a) illustrates a 20×1 array, FIG. 8(b) illustrates a 10×2 array, and FIG. 8(c) illustrates a 5×4 array.

MODE FOR CARRYING OUT THE INVENTION

Hereinafter, a photovoltaic power generation system according to a first embodiment of the present disclosure will be described with reference to the appended drawings.

Configuration of First Embodiment

Figure 1:
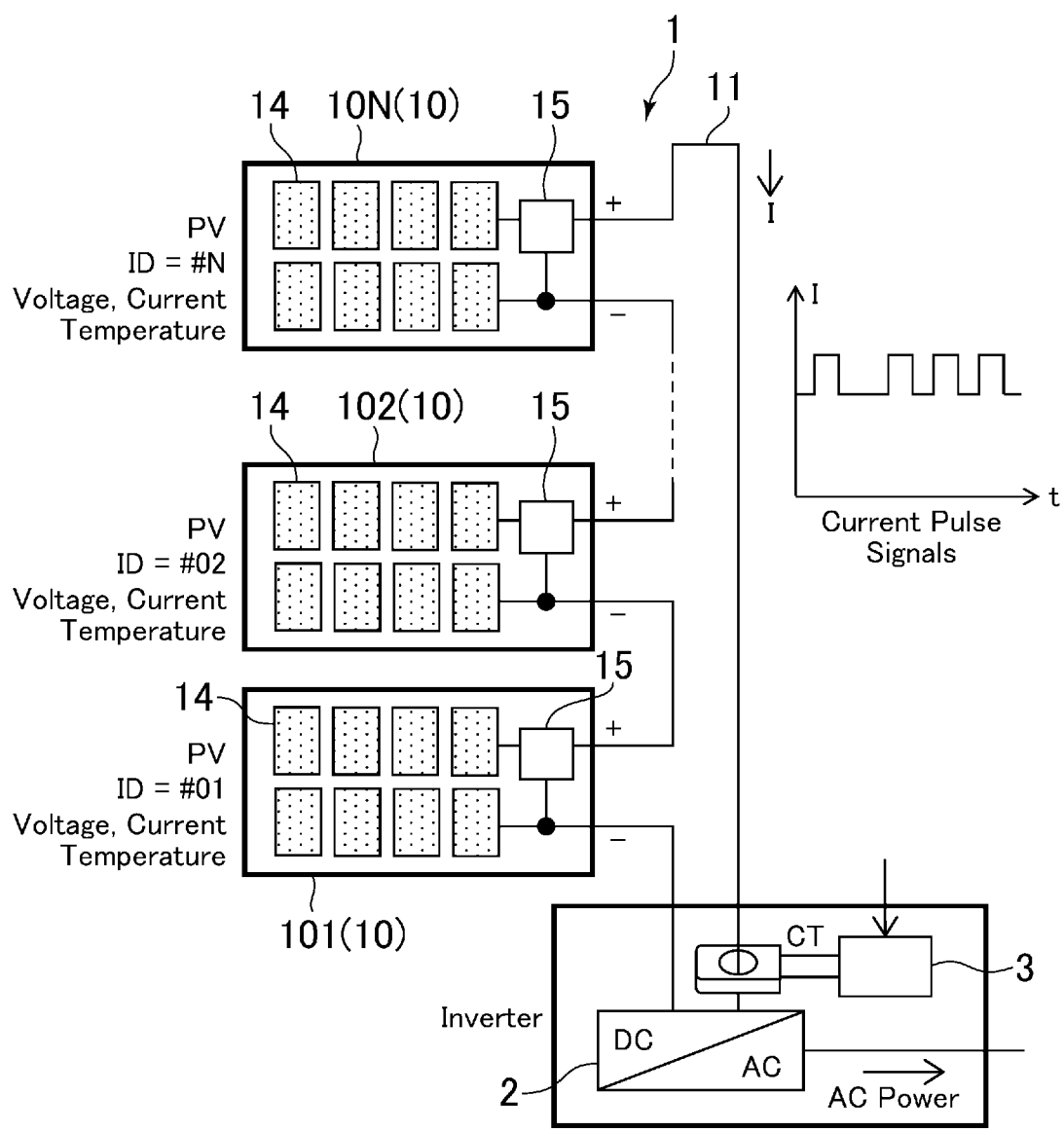
FIG. 1 is a block diagram illustrating a schematic configuration of a photovoltaic power generation system in a first embodiment of the present disclosure.
Figure 2:
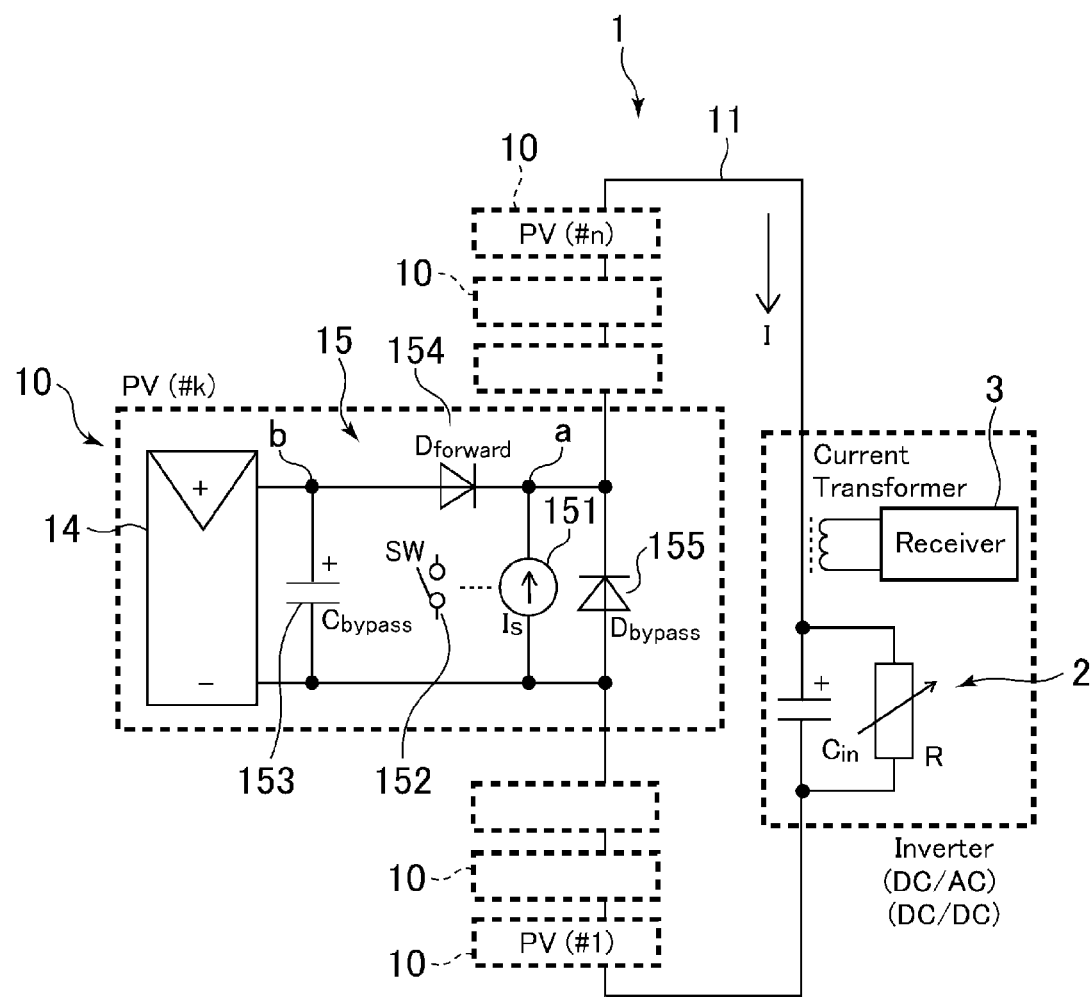
FIG. 2 is an explanatory diagram for describing a configuration of a photovoltaic string used in the system of FIG. 1.
Figure 3:
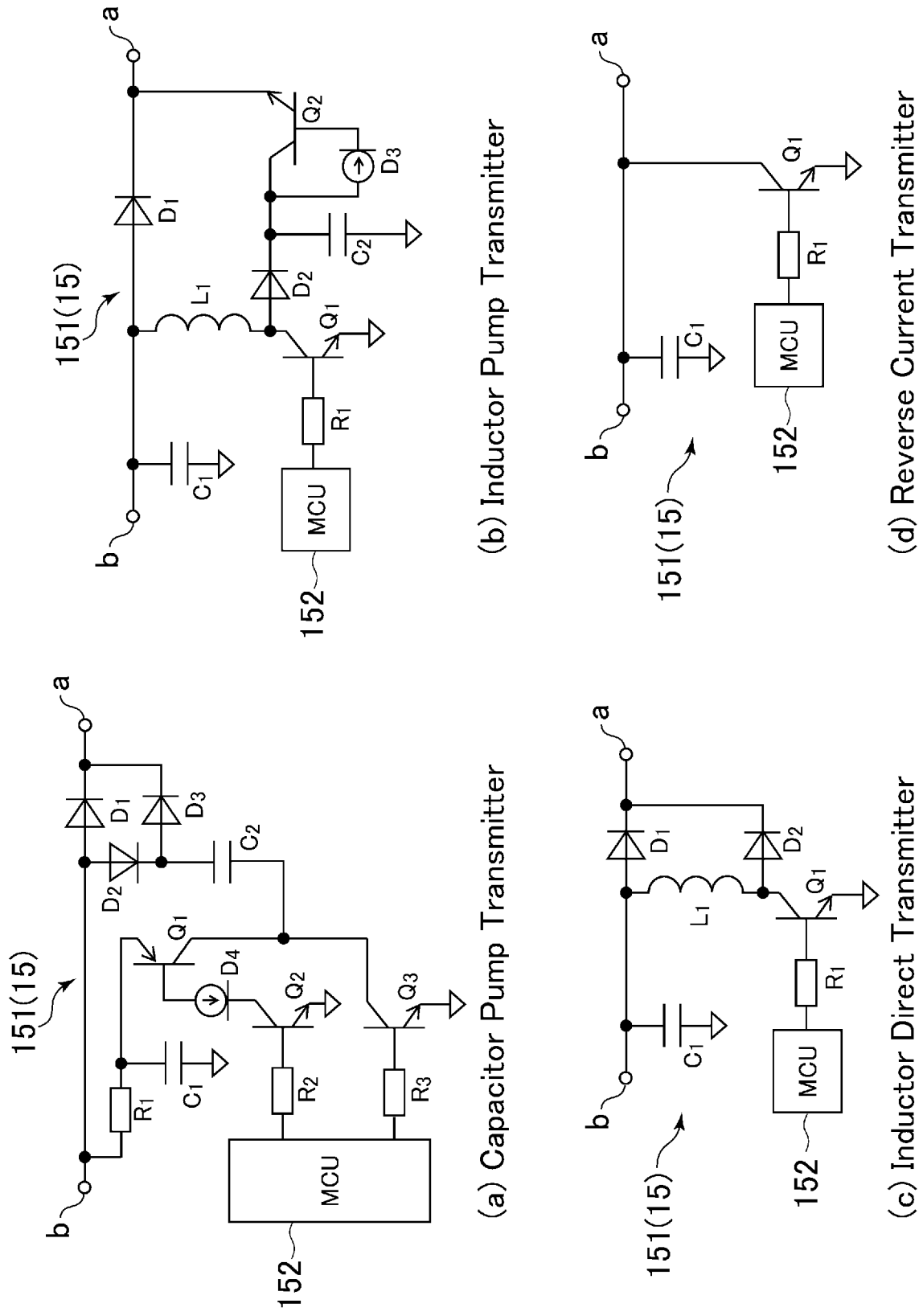
FIG. 3 is a circuit diagram illustrating a configuration example of a current source in a transmitter (transmitting apparatus) used in the system of FIG. 1.

A photovoltaic power generation system of the present embodiment includes a photovoltaic string 1, a power extractor 2, and a receiver 3 (see FIGS. 1 and 2).

(Photovoltaic String)

The photovoltaic string 1 includes a plurality of photovoltaic modules 10 and a power line 11. In the following description, when an N-th photovoltaic module is referred to, a suffix is added to a reference numeral like a photovoltaic module 10N. In a case in which a photovoltaic module 10 is simply referred to, it indicates any one photovoltaic module.

(Photovoltaic Module)

A plurality of photovoltaic modules 10 are connected in series via the power line 11, and thus electric power obtained by photovoltaic cells can be transmitted via the power line 11.

Since the respective photovoltaic modules 10 basically have the same configuration, the following description will proceed using one photovoltaic module 10 as an example. Here, the configuration of each photovoltaic module may be changed if necessary.

The photovoltaic module 10 includes a photovoltaic element 14 and a transmitter 15. The transmitter 15 corresponds to one specific example of the transmitting apparatus according to the present disclosure.

(Photovoltaic Element)

The photovoltaic element 14 can be understood as one power source as illustrated in FIG. 2. This power source also depends on an operation mode but basically has a characteristic of a current source (ideally, internal resistance=∞) other than a voltage source (ideally, internal resistance=0). Since the photovoltaic element can basically have the same structure as that of a photovoltaic element of a related art, detailed description thereof is omitted.

(Transmitter)

The transmitter 15 includes a current source 151, a controller 152, and a bypass capacitor 153 (see FIG. 2). Further, the transmitter 15 of the present example additionally includes a transmitting diode 154 and a bypass diode 155.

(Current source)

The current source 151 is connected to the power line 11 in parallel with the photovoltaic cell element 14. A specific configuration example of the current source will be described later. The current polarity of the current source 151 connected to the power line 11 is the same as the photovoltaic element 14 to which the current source 151 is connected in parallel (Controller)

The controller 152 controls the current value in the current source 151 such that the current signal is generated. For example, a microprocessor (a micro-controller unit (MCU)) can be used as the controller. Here, the controller is not limited to this example as long as current value control (for example, on/off control) of the current source 151 can be performed at a desired timing so that an appropriate current signal is generated.

(Bypass Capacitor)

The bypass capacitor 153 is connected to the power line 11 in parallel with the photovoltaic element 14 and the current source 151. In the present embodiment, with this configuration, the current signal transmitted through the bypass capacitor 153 from a negative electrode side in the photovoltaic string 1 can be transmitted to a positive electrode side (in a direction of an electric current I in FIG. 2).

(Transmitting Diode)

The transmitting diode 154 is connected between the current source 151 and the bypass capacitor 153. In the present embodiment, the electric current is prevented from being sent from the current source 151 to the bypass capacitor 153, and the electric current flows into the power line 11 accordingly.

(Bypass Diode)

The bypass diode 155 is inserted in series between a (k−1)-th photovoltaic module and a (k+1)-th photovoltaic module. Here, k is a number of a photovoltaic module of interest, and $1 \leq k \leq N$ in the present example. The bypass diode 155 allows the electric current to flow through the bypass diode 155 even when a certain failure occurs in a k-th photovoltaic module. Since the bypass diode 155 can be constructed, similarly to that used in the photovoltaic module of the related art, further detailed description is omitted.

(Power Extractor)

In this embodiment, the power extractor 2 is configured to extract electric power from the power line 11 using an inverter (specifically, a DC/AC inverter or a DC/DC converter). Any device can be used as the power extractor 2 as long as the electric power transmitted from the photovoltaic module 10 can be extracted from the power line 11. Since an existing device can be used as the power extractor of the present embodiment, further description is omitted.

(Receiver)

The receiver 3 is configured to receive the current signal transmitted from the transmitter 15 via the power line 11. The receiver 3 of the present example has a configuration capable of extracting a change in the current value as a signal using a current transformer CT. Detailed configuration of the receiver will be described later.

(Operation of Transmitter in the Present Embodiment)

In the transmitter 15 of the present embodiment described above, it is possible to cause the current signal to be generated by switching the current source 151 (on/off switching). The current signal generated by the current source 151 is superimposed on the electric current flowing through the power line 11 and transmitted to the receiver 3. Here, in the present embodiment, since the transmitting diode 154 is installed, the current signal from the current source 151 does not flow in the direction of the bypass capacitor 153. If a part of the current signal flows in the direction of the bypass capacitor 153, since a signal component passes through the capacitor, a noise rides on the power line 11 and the SN ratio of the current signal deteriorates. In the present embodiment, it is possible to improve the SN ratio of the current signal by suppressing the occurrence of such a noise.

Further, in the present embodiment, the current signal generated on an upstream side (for example, the (k−1)-th photovoltaic module) in an electric current direction is transmitted to the k-th photovoltaic module via the power line 11. This current signal passes through the bypass capacitor 153 and the transmitting diode 154 in the k-th photovoltaic module and is transmitted to a downstream side (for example, the (k+1)-th photovoltaic module). Basically, since the photovoltaic element 14 is the current source, when the bypass capacitor 153 is not installed, the current signal is stopped by the current source and not transmitted to the downstream side. On the other hand, in the present embodiment, since the bypass capacitor 153 is installed, it is possible to transmit the current signal to the downstream side. Further, in the present embodiment, since the current signal is transferred by the capacitor 153 without depending on the parasitic capacitance of the photovoltaic module, the SN ratio of the current signal can be improved.

The technology of the present embodiment can be applied even in a case in which the photovoltaic string 1 is connected in parallel and has an array configuration. In the normal photovoltaic string, since a diode for backflow prevention is inserted, it is possible to prevent the current signal flowing through a certain string from flowing into another string. Therefore, even in the case of the array configuration, it is possible to detect by causing the current signal to flow in the direction of the receiver 3.

(Example of Current Source)

A further specific example of the current source 151 (including the controller 152) used in the transmitter 15 in the above embodiment will be described below with reference to FIGS. 3(a) to 3(d). Note that, in the description of these examples, common reference numerals such as a resistor R1 and a capacitor C1 are used, but an appropriate characteristic is employed in accordance with each circuit configuration. Further, terminals a and b in FIG. 3 correspond to terminals a and b in FIG. 2.

(First Example of Current Source)

A transmitter 15 (see FIG. 3(a)) of a first example is of a capacitor pump type. This transmitter is configured to generate an electric current by using electric charges accumulated in a capacitor C2. When the current source 151 is turned off, the controller 152 (specifically, the microprocessor) turns on a transistor Q3 and turns off Q2 (that is, turns off Q1 eventually). Accordingly, the capacitor C2 is in a state in which electric charges are accumulated. To turn on the current source 151, the transistor Q3 is turned off, and Q2 is turned on (that is, Q1 is turned on accordingly). Accordingly, a potential of the capacitor C2 on a diode (D3 or D2) side rises to be nearly twice (because the potential of the capacitor C2 is added to the potential of the capacitor C1). The capacitor C2 transmits the electric current via the diode D3. The magnitude of the electric current is controlled in accordance with the electric current flowing through the transistor Q1. A current limiting diode D4 is connected to the transistor Q1 and controls the magnitude of the electric current flowing through the transistor Q1. The potential of the capacitor C1 decreases during pulse transmission (that is, during transmission of an ON waveform in the current signal), but since it is connected to the power source line via the resistor R1, the magnitude of the electric current drawn from the power source line is smaller than the magnitude of the electric current transmitted by the capacitor C2.

The first example corresponds to one specific example of a "configuration in which the current source includes the pump capacitor that accumulates electric charges when the current signal is turned off and transmits the electric current to the power line when the current signal is turned on in accordance with a signal from the controller."

(Second Example of Current Source)

A transmitter 15 (see FIG. 3(b)) of a second example can be called an inductor pump type. This transmitter 15 uses a capacitor C2 for pushing an electric current into a circuit. When current source 151 is turned off, the controller 152 causes a transistor Q1 to be kept off. In order to turn on the current source 151 and generate a pulse, the controller 152 first turns on the transistor Q1 for a predetermined period time and then turns the transistor Q1 off. During the ON state, a coil L1 gradually draws an electric current from a capacitor C1. Thereafter, when the transistor Q1 is turned off, the electric current from the coil L1 flows to the capacitor C2 via a diode D2 and increases a voltage thereof. A diode D3 is an electric current control diode which limits a maximum electric current generated by a transistor Q2. Thereafter, with the passage of time, the transistor Q2 is turned off, and the current source 151 is turned off accordingly.

(Third Example of Current Source)

A transmitter 15 (see FIG. 3(c)) of a third example can be call a coil direct coupling type. This transmitter 15 is configured to generate an electric current using magnetic flux accumulated in a coil L1 (cause it to function as a current source). When the current source 151 is turned off, a transistor Q1 is turned off. In a case in which a pulse current is generated from the current source 151, the controller 152 first turns on the transistor Q1 for a certain period of time. Thereafter, the transistor Q1 is turned off. While the transistor Q1 is in the ON state, the coil L1 gradually draws an electric current from the capacitor C1 and functions as the current source. When the transistor Q1 is turned OFF, the electric current is transmitted from the coil L1 via a diode D2. The electric current to be transmitted is stopped in due course (the current source 151 is regarded as being turned off accordingly).

This third example corresponds to one specific example of a "configuration in which the current source includes a discharging coil, magnetic flux is accumulated by drawing the electric current in response to an ON signal from the controller, and the current signal is turned off after the electric current is transmitted to the power line for a period of time according to a time constant in response to an OFF signal from the controller."

(Fourth Example of Current Source)

A transmitter 15 (see FIG. 3(d)) of a fourth example can be called a reverse electric current type. This transmitter 15 uses a transistor Q1 for drawing the electric current from the circuit, that is, for feeding an electric current of a opposite polarity to the circuit. When the current source 151 is turned off, the controller 152 switches to turn off the transistor Q1. In order to turn on the current source 151, the controller turns on the transistor Q1 via a resistor R 1. Here, by setting the resistor R1 to a large value appropriately, it is possible to limit the maximum electric current flowing through the transistor Q1. Note that, in this example, since a positive electrical current does not flow a direction from the current source 151 to the transmitting diode 154, installation of the transmitting diode 154 can be omitted.

(Example of Receiver)

Next, a specific configuration example of the receiver 3 will be described with reference to FIG. 4. The receiver 3 can extract a change in the electric current I (see FIG. 2) flowing through the circuit without contacting the power line 11 using the current transformer CT and extract a signal transmitted from the transmitter 15 by observing it through an AD converter ADC. In FIG. 4, AREF indicates a reference voltage of the AD converter, and a contact point on one side of the current transformer CT is attached to a voltage divided by resistors R1 and R2 (normally, R1=R2). A resistor R3 is attached between both contact points of the current transformer CT. In a case in which the contact point on the other side of the current transformer CT is connected to an input of the AD converter ADC, it is possible to observe the change in the electric current as the change in the voltage.

A high frequency noise flowing through the power line 11 can be cut by inserting a capacitor C2 between both ends of the current transformer CT. Further, since a low frequency noise is often in a band of about 50 Hz/60 Hz, it can be removed by signal processing (differential processing) after AD conversion.

(Example of Receiving Operation in Receiver)

In a case in which a turn ratio of the current transformer CT is N:1, an electric current of 1/N of an electric current ΔI flowing through the power line 11 (primary side) (ΔI indicates a change amount in the electric current I) occurs on the secondary side. Resistors R1 and R2 and a capacitor C1 generate a constant voltage. Normally, when R1=R2, ½ AREF (here, an analog reference voltage indicated by AREF) is generated. The electric current generated by the current transformer CT flows through the resistor R3, and thus an input voltage of the AD converter ADC is $$V_{ADC} = \frac{AREF}{2} + \frac{R_3 \Delta I}{N} \quad (1)$$

Figure 5:
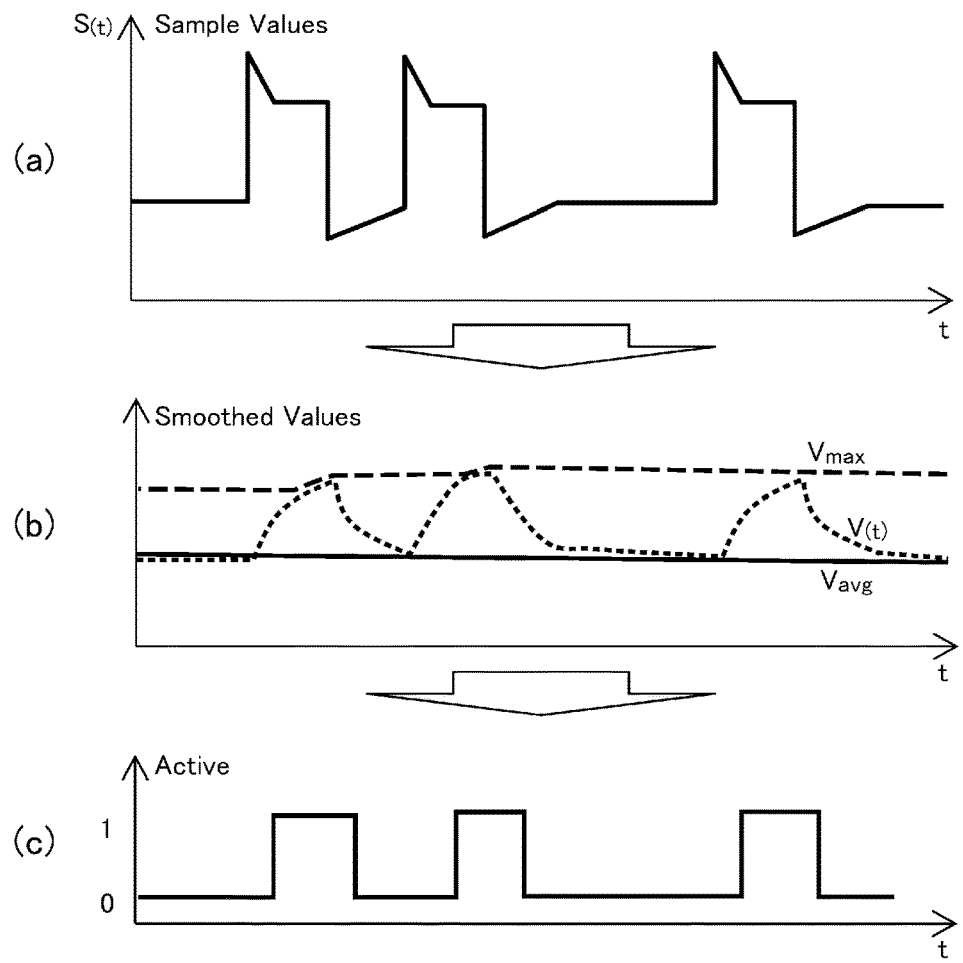
FIG. 5 is an explanatory diagram for describing a time waveform detected in a receiver and a smoothing process therefor.

For example, in a case in which AREF=5 V, N=3000, −100 mA<ΔI<100 mA, and the resistor R3=30 kΩ, an input voltage range of the AD converter ADC is 1.5 V to 3.5 V (that is, 1.5 V<VADC<3.5 V). As illustrated in FIG. 5, in order to detect a pulse, a smoothing step is necessary. This is because a pulse shape is not an exact rectangle, and the signal intensity varies depending on a configuration of the photovoltaic module. For this reason, the receiver of the present example calculates a smoothed value as follows.

$$V(t) = \alpha_1 S(t) + (1-\alpha_1) V(t-1) \quad (2)$$

$$V_{avg}(t) = \alpha_2 V(t) + (1-\alpha_2) V_{avg}(t-1) \quad (3)$$

$$V_{max}(t) = \max\{V(t), V_{avg}(t) + \text{MINDIFF},$$
$$\alpha_3 (V_{max}(t-1) - V_{avg}(t-1)) + V_{avg}(t-1)\} \quad (4)$$

$$0 < \alpha_2 < \alpha_1 < \alpha_3 < 1 \quad (5)$$

Here, S (t) indicates a sample value obtained by the AD converter (FIG. 5(a)), V(t) is a primary smoothed value, and Vmax(t) and Vavg(t) are smoothed values and given strength and an offset of a pulse signal (FIG. 5(b)). α1, α2, and α3 in Formula are time constants. MINDIFF>0 is a constant parameter, which gives the smallest difference between Vmax(t) and Vavg(t).

A stage after smoothing is a pulse detection stage. In the present embodiment, a function active(t) is introduced. This is a function which becomes 1 when the pulse signal is active and becomes 0 in a case in which the pulse signal is not active. This function can be implemented, for example, as follows.

```
function active(t) {
    If V(t) > β (V_max(t) − V_avg(t)) + V_avg(t) Then,
        return 1
    Else If
        return 0
    End If
}
```

Here, $\beta$ ($0<\beta<1$) is a threshold value for pulse detection.

Second Embodiment

Figure 6:
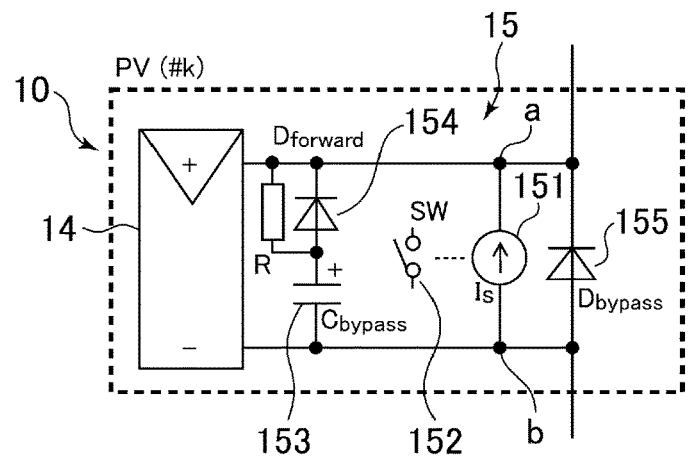
FIG. 6 is an explanatory diagram for describing a configuration of a transmitter used in a photovoltaic power generation system in a second embodiment of the present disclosure.

Next, a transmitter 15 used in a photovoltaic power generation system according to a second embodiment of the present disclosure will be described with reference to FIG. 6. Note that, in the description of the second embodiment, the same reference numerals are used for components which are basically common to components of the first embodiment to avoid complication of the description.

In the transmitter 15 of the second embodiment, the transmitting diode 154 is connected in series with the bypass capacitor 153. Further, the transmitter 15 includes a resistor R which is inserted in series with respect to the bypass capacitor 153 and in parallel with respect to the transmitting diode 154. In the second embodiment, since there is no voltage drop (that is, power loss) by the transmitting diode 154 with respect to the generated power from the photovoltaic element 14, there is an advantage in that the power generation efficiency can be improved. A resistance value of the resistor R is set to a value necessary for causing the bypass capacitor to function.

The other configurations and advantages of the photovoltaic power generation system of the second embodiment are similar to those in the first embodiment, and thus detailed description thereof is omitted.

Experiment Example

Experiment examples of the transmitter 15 and the receiver 3 used in the photovoltaic power generation system of the first embodiment will be described below. The followings will be reviewed below:

(1) a pulse waveform in a different photovoltaic cell operation mode; and
(2) a pulse waveform in a configuration of a different photovoltaic array. Further, a data frame detected in the receiver will be reviewed as well.

(Premises and Conditions of Experiment)

In this experiment, data transmission using 20 photovoltaic modules has been reviewed. A model of a used photovoltaic element is SY-M12 W-12 (available from SUNY000 solar limited). An open circuit voltage is 21.8 V, and a short circuit current is 0.73 A. Maximum power is 12 W (at 17.4 V and 0.69 A).

1000 μF was used as the bypass capacitor 153 and the bypass diode 155 was inserted between the photovoltaic modules. A load resistor in this experiment includes an input capacitance of 190 μF and a variable resistor whose resistance value is variable between 100Ω and 600Ω.

In the experiment, the transmitter 15 was attached to a first (#1) photovoltaic module 10, and the current transformer CT of the receiver 3 was attached to a load portion. Further, in the experiments, the current sources 151 of different types (the respective types illustrated in FIGS. 3(a) to 3(d)) were used. Table 1 below shows values of parameters in the transmitter 15 and the receiver 3 used in this experiment example. In Table 1, the examples correspond to the examples of FIGS. 3(a) to 3(d) in order from the top. Of course, these values are just an example, and the present disclosure is not limited by these values.

TABLE 1

| Type | Part | Parameter | Part | Parameter |
|---|---|---|---|---|
| Capacitor | $R_1$ | 300Ω | $R_2$ | 510Ω |
| Pump | $R_3$ | 200Ω | $C_1$ | 2200 uF |
| Transmitter | $C_2$ | 470 uF | $D_1$ | SBM1045VSS |
|  | $D_2$ | PS2010 | $D_3$ | PS2010 |
|  | $D_4$ | E-102(1 mA CRD) × 2 in parallel | | |
|  | $Q_1$ | 2SA1359 | $Q_2$ | 2SC1815 |
|  | $Q_3$ | 2SC3422 | | |
| Inductor | $R_1$ | 2.0 kΩ | $C_1$ | 2200 uF |
| Pump | $C_2$ | 10 uF | $L_1$ | 470 uH |
| Transmitter | $D_1$ | SBM1045VSS | $D_2$ | ER504 |
|  | $D_3$ | E-102(1 mA CRD) × 2 in parallel | | |
|  | $Q_1$ | 2SC4495 | $Q_2$ | 2SC3422 |
| Inductor | $R_1$ | 2.0 kΩ | $C_1$ | 2200 uF |
| Direct | $L_1$ | 470 uH | $D_1$ | SBM1045VSS |
| Transmitter | $D_2$ | ER504 | $Q_1$ | 2SC4495 |
| Reverse | $R_1$ | 10 kΩ | $C_1$ | 2200 uF |
| Transmitter | $Q_1$ | 2SC4495 | | |
| Receiver | $R_1$ | 10 kΩ | $R_2$ | 10 kΩ |
|  | $R_3$ | 30 kΩ | $C_1$ | 1.0 uF |
|  | CT | CTS-10-CLS (u-RD) N:1 = 3000:1 | | |

Further, in the present embodiment, ATmega 328 P-PU having a clock frequency of 16 MHz was used as the controller 152.

Further, an oscilloscope (MDO 3014 available from Tektronix) was used for measurement of this example.

In this experiment example, a pulse slot of 1000 μsec was used. For the current sources 151 of the capacitor pump type (FIG. 3(a)) and the reverse electric current type (FIG. 3(d)), initial 500 μsec was taken as an activation phase, and subsequent 500 μsec was taken as an inactivation phase. For the current sources 151 of the coil base type (FIGS. 3(b) and 3(c)), preceding 200 μsec was taken as a coil charging period, and subsequent 800 μsec was taken as a current opening time.

First Experiment Example: Pulse Shape at Different I-V Points

An electrical characteristic of the photovoltaic module 10 depend on a situation of an I-V curve. For example, it is assumed that $\alpha$, $\beta$, and $\gamma$ ($\alpha<\beta<\gamma$) indicate operating voltages of the photovoltaic module 10, and the voltage $\beta$ corresponds to a maximum power point. At the voltage $\alpha$, the photovoltaic module 10 operates as a constant current source, but at a voltage $\gamma$, the photovoltaic module 10 operates as a constant voltage source. In this experiment example, the change in the pulse waveform in the example using ten photovoltaic modules 10 connected in series was reviewed. The following Table 2 shows an operating voltage (V) in this experiment example. Of course, these are just an example, and the present disclosure is not limited thereto. Columns in the following Table 2 correspond to FIGS. 3(a) to 3(d) from the left to the right.

TABLE 2

|  | Capacitor Pump | Inductor Pump | Inductor Direct | Reverse Current |
|---|---|---|---|---|
| $\alpha$ | 166 | 166 | 162 | 167 |
| $\beta$ | 173 | 174 | 174 | 174 |
| $\gamma$ | 184 | 184 | 184 | 184 |

Figure 7:
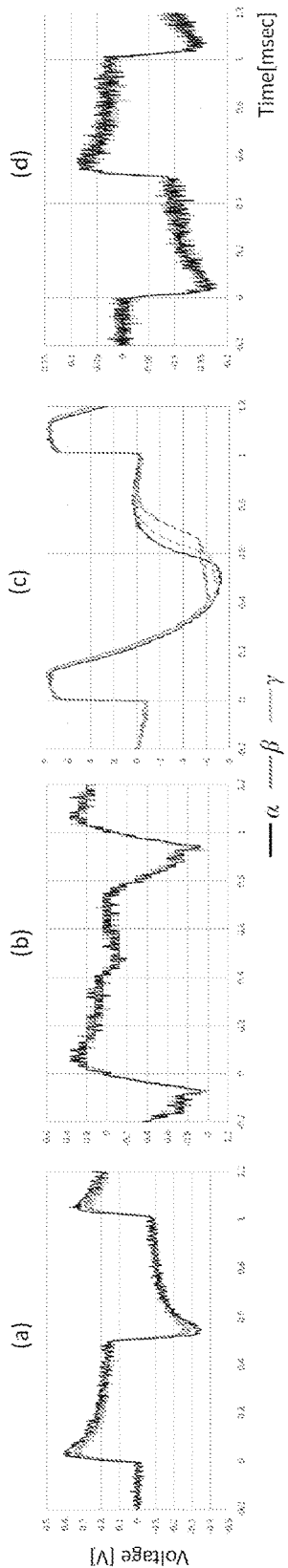
FIG. 7 is a graph illustrating a pulse waveform observed in a receiver corresponding to each type of current source in FIGS. 3(a) to 3(d).
Figure 9:
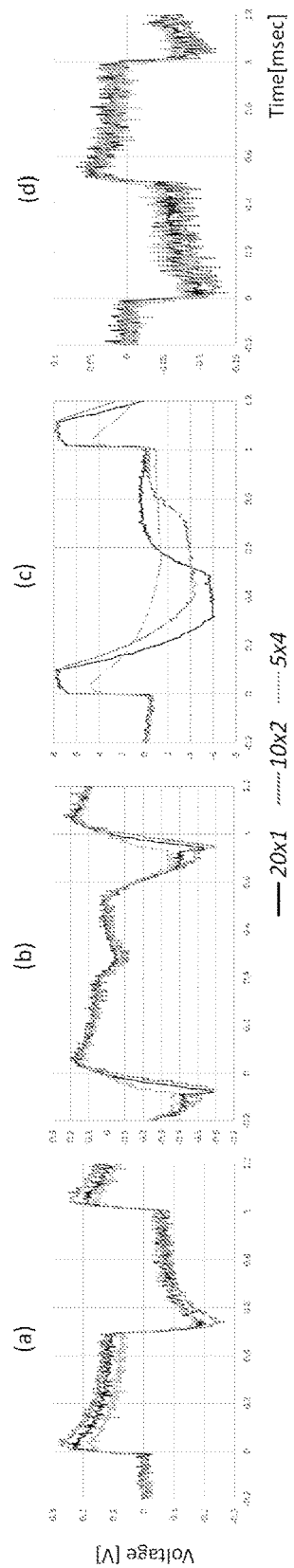
FIG. 9 is a graph illustrating a pulse waveform observed in a receiver corresponding to each type of current source in FIGS. 3(a) to 3(d).

FIG. 7 shows a result. In the case of a capacitor pump type illustrated in FIG. 7(a), a definite positive pulse with a magnitude of +0.35 V and a negative pulse subsequent thereto were obtained. In the case of an inductor pump type illustrated in FIG. 7(b), initially, a negative voltage of −0.1 V was generated. This is probably because the electric current was charged to the coil. Thereafter, a slightly indefinite pulse of +0.3 V was generated for 200 μsec. In the case of a direct coil type illustrated in FIG. 7(c), a negative voltage of −1.0 V was similarly generated, but thereafter a definite large pulse of +7 V was generated for 200 μsec. Thereafter, a negative voltage pulse of −6 V was generated. In the case of a reverse voltage type illustrated in FIG. 7(d), a characteristic which is inverted upside down from that FIG. 7(a) was shown.

In these results, there is a small difference between the voltages α, β, and γ.

Second Experiment Example

Next, as second experiment example, a pulse shape corresponding to the array configuration of the photovoltaic module 10 was reviewed. FIGS. 8(a) to 8(c) illustrate three array configuration patterns. 20×1 is an array in which 20 panels are connected in series (that is, one as the photovoltaic string), 10×2 is an array in which two strings each including ten panels are arranged in parallel, and 5×4 is an array in which four strings each including five panels are arranged in parallel. In this experiment example, in each configuration, a voltage giving the maximum power was used as the operating voltage. In other words, 348 V was used in the case of 20×1, 174 V was used in the case of 10×2, and 87 V was used in the case of 5×4.

The results are illustrated in FIGS. 9(a) to 9(d). A relation between the graphs and the type of the current source is similar to that in the case of FIG. 7. When these results are considered, the magnitude of the obtained pulse signal strength has a relation of 10×2 array>20×1 array>5×4 array. However, in all the cases, the signal strength exceeded a detection level. Therefore, it can be understood that the technology of the present disclosure can also be used for photovoltaic arrays constructed by arranging the photovoltaic strings in parallel.

Third Experiment Example

In a third experiment example, a data frame transmission characteristic was reviewed. In this experiment example, the capacitor pump type (see FIG. 7(a)) and the coil direct coupling type (see FIG. 7(c)) were used.

A data frame in this experiment example was set as follows. In other words, the data frame starts with an 8-bit signal 11111111. Subsequently, four bytes (for example, one byte is assigned to each for a panel ID, a voltage, an electric current, and a temperature) are continued. Finally, a checksum such as CRC 8 for error detection was inserted. A total length of the data frame is 48 bits. In this example, values of 1 and 0 are transmitted by inserting an interval of 1000 msec, and the transmitter 15 has generated a pulse of 500 μsec when the value was 1 and has not generated a pulse when the value was 0.

Figure 10:
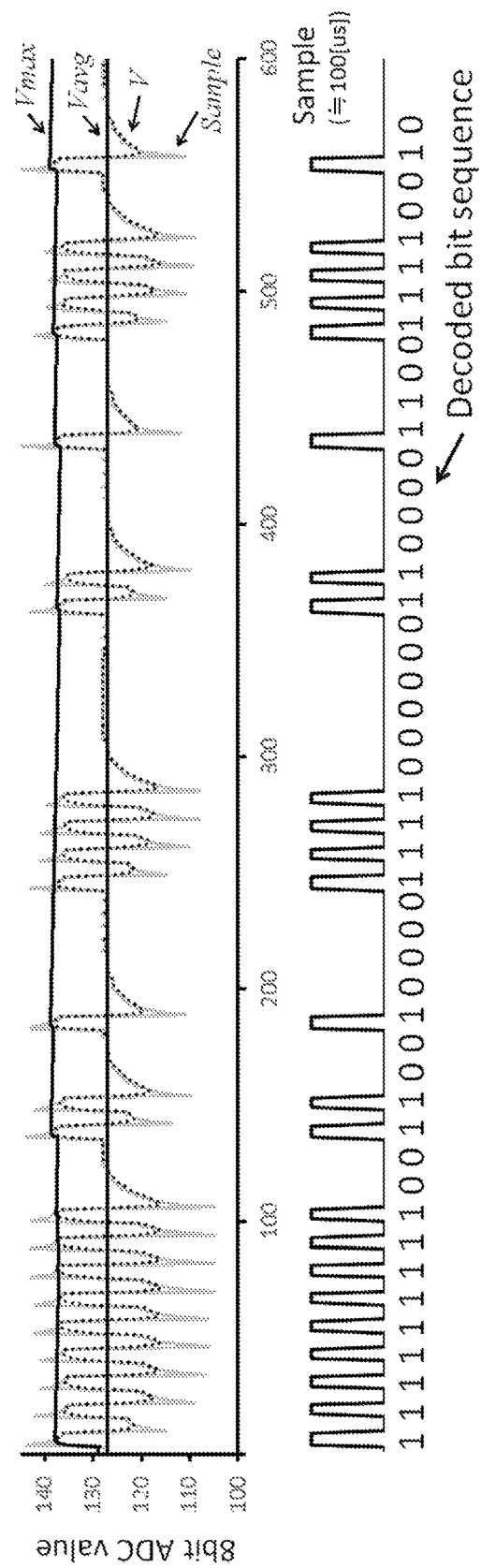
FIG. 10 is a graph illustrating a detection result of a current signal generated by a current source of a type shown in FIG. 3(a).
Figure 11:
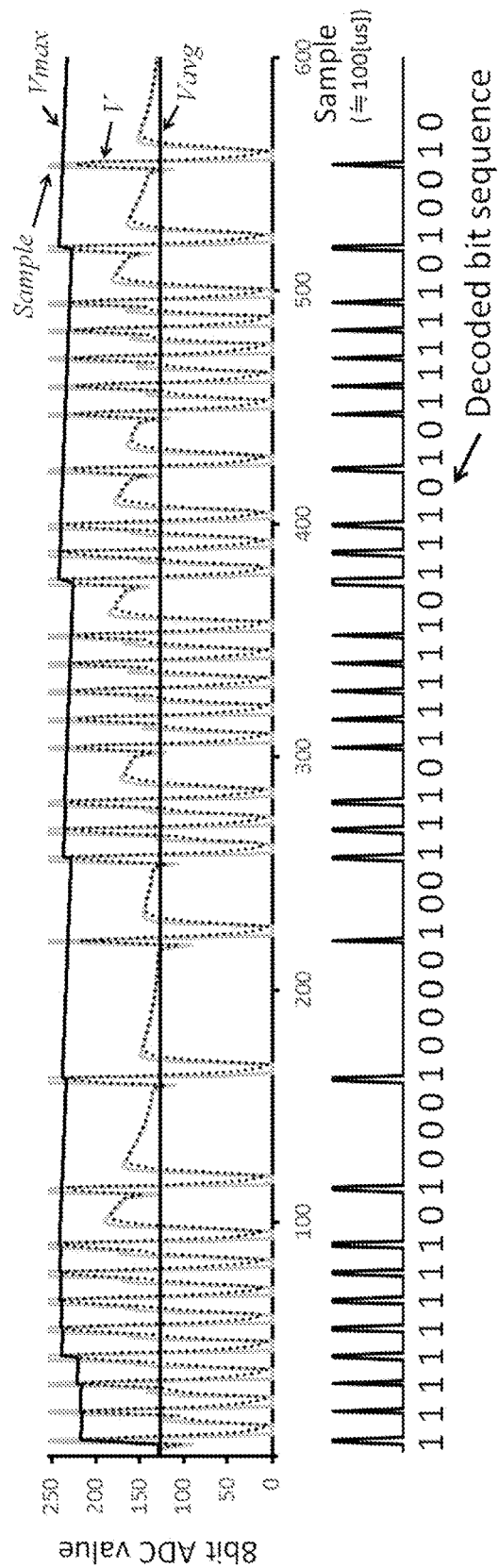
FIG. 11 is a graph illustrating a detection result of a current signal generated by a current source of a type shown in FIG. 3(c).

In this experiment example, as a parameter set (α1, α2, α3, β, and MINDIFF) in a specific configuration example of the receiver 3 (see Formulas (1) to (5)), (0.25, 0.00001, 0.9, 0.5, 2) was set in the case of the transmitter of the capacitor pump type, and (0.5, 0.00001, 0.999, 0.75, 2) was set in the case of the transmitter of the coil direct coupling type. A sampling interval was set to about 100 μsec. FIGS. 10 and 11 illustrate (1) V (t), Vmax(t), and Varg(t) (these are values obtained by smoothing S (t)) and sampling data in the AD converter, and (2) a pattern of active (t) (detected as a pulse signal).

As indicated in the result, the pulse can be easily detected by the receiver 3. However, in a case in which a plurality of zeros are continued, time synchronization is likely to be lost.

Note that, the pulse modulation scheme described above is merely an example, and an appropriate modulation scheme such as pulse width modulation, pulse position modulation, or the like can be used. Further, in a case in which current signals from a plurality of current sources 151 are superimposed on the power line 11, a scheme capable of distinguishing the signals as in a spreading coding scheme can be used. Of course, it is also possible to transmit the current signal by causing a signal transmission timing to differ for each panel (that is, in accordance with a time division scheme).

Note that, a combination of the transmitter and the receiver corresponds to a specific example of a monitoring apparatus in the present disclosure.

A combination of the monitoring apparatus and the power extractor 2 that extracts the electric power transmitted via the power line corresponds to one specific example of the photovoltaic power generation system according to the present disclosure.

Note that, the content of the present disclosure is not limited to the above embodiments. The present disclosure can include various modifications made on the specific configurations within the scope described in claims set forth below. For example, the respective circuit elements used in the above embodiments may be various kinds of elements or electronic devices having equivalent functions.

REFERENCE SIGNS LIST

1 Photovoltaic string
10 Photovoltaic module
11 Power line
14 Photovoltaic element
15 Transmitter
151 Current source
152 Controller
153 Bypass capacitor
154 Transmitting diode
155 Bypass diode
2 Power extractor
3 Receiver
ADC AD converter
CT Current transformer

The invention claimed is:

1. A transmitting apparatus for transmitting monitoring information as a current signal in a photovoltaic string including a plurality of photovoltaic elements connected to each other in series via a power line, the transmitting apparatus comprising:
   a DC current source connected to provide DC current to the photovoltaic string;
   a controller; and
   a bypass capacitor;
   wherein the DC current source is connected with power line in parallel with each of the photovoltaic elements,
   a current polarity of the DC current source connected to the power line is the same as the photovoltaic element to which the DC current source is connected in parallel;

the controller is configured to control a DC current value of the DC current source such that the current signal is generated; and the bypass capacitor is connected to the power line in parallel with the each of the photovoltaic elements and the DC current source so that a current signal transmitted through the bypass capacitor from a negative electrode side in the photovoltaic string can be transmitted to a positive electrode side.

2. The transmitting apparatus according to claim 1, further comprising a transmitting diode which is connected between the DC current source and the bypass capacitor so as to block an electric current from being transmitted from the DC current source to the bypass capacitor and to feed the electric current to the power line.

3. The transmitting apparatus according to claim 2, further comprising a resistor which is connected in series to the bypass capacitor and in parallel to the transmitting diode.

4. The transmitting apparatus according to claim 3, wherein the DC current source includes a pump capacitor that accumulates electric charges when the current signal is turned off in response to a signal from the controller and transmits an electric current to the power line when the current signal is turned on.

5. The transmitting apparatus according to claim 3, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

6. The transmitting apparatus according to claim 2, wherein the DC current source includes a pump capacitor that accumulates electric charges when the current signal is turned off in response to a signal from the controller and transmits an electric current to the power line when the current signal is turned on.

7. The transmitting apparatus according to claim 2, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

8. The transmitting apparatus according to claim 1, wherein the DC current source includes a pump capacitor that accumulates electric charges when the current signal is turned off in response to a signal from the controller and transmits an electric current to the power line when the current signal is turned on.

9. The transmitting apparatus according to claim 1, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

10. A monitoring apparatus, comprising:
the transmitting apparatus according to claim 1; and
a receiver configured to receive the current signal transmitted via the power line.

11. A photovoltaic power generation system, comprising:
the monitoring apparatus according to claim 10; and
a power extractor that extracts electric power transmitted via the power line.

12. The transmitting apparatus according to claim 1, further comprising a transmitting diode which is connected between the DC current source and the bypass capacitor so as to block an electric current from being transmitted from the DC current source to the bypass capacitor and to feed the electric current to the power line.

13. The transmitting apparatus according to claim 12, further comprising a resistor which is connected in series to the bypass capacitor and in parallel to the transmitting diode.

14. The transmitting apparatus according to claim 13, wherein the DC current source includes a pump capacitor that accumulates electric charges when the current signal is turned off in response to a signal from the controller and transmits an electric current to the power line when the current signal is turned on.

15. The transmitting apparatus according to claim 13, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

16. The transmitting apparatus according to claim 12, wherein the DC current source includes a pump capacitor that accumulates electric charges when the current signal is turned off in response to a signal from the controller and transmits an electric current to the power line when the current signal is turned on.

17. The transmitting apparatus according to claim 12, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

18. The transmitting apparatus according to claim 1, wherein the DC current source includes a pump capacitor that accumulates electric charges when the current signal is turned off in response to a signal from the controller and transmits an electric current to the power line when the current signal is turned on.

19. The transmitting apparatus according to claim 1, wherein the DC current source includes a discharging coil configured to accumulates magnetic flux by drawing an electric current in response to an ON signal from the controller, and to turn off the current signal after the electric current is transmitted to the power line for a period of time according to a time constant of the discharging coil in response to an OFF signal from the controller.

* * * * *